(12) United States Patent
Lohneis

(10) Patent No.: US 12,344,290 B2
(45) Date of Patent: Jul. 1, 2025

(54) METHOD AND DEVICE FOR CONTROLLING A RAIL VEHICLE

(71) Applicant: Siemens Mobility GmbH, Munich (DE)

(72) Inventor: Georg Lohneis, Ebensfeld (DE)

(73) Assignee: Siemens Mobility GmbH, Munich (DE)

(*) Notice: Subject to any disclaimer, the term of this patent is extended or adjusted under 35 U.S.C. 154(b) by 817 days.

(21) Appl. No.: 17/254,402

(22) PCT Filed: Jun. 14, 2019

(86) PCT No.: PCT/EP2019/065651
§ 371 (c)(1),
(2) Date: Dec. 21, 2020

(87) PCT Pub. No.: WO2019/243181
PCT Pub. Date: Dec. 26, 2019

(65) Prior Publication Data
US 2021/0269073 A1    Sep. 2, 2021

(30) Foreign Application Priority Data

Jun. 21, 2018    (DE) ............... 10 2018 210 112.4

(51) Int. Cl.
*B61L 15/00* (2006.01)
*G05B 13/02* (2006.01)

(52) U.S. Cl.
CPC ......... *B61L 15/0009* (2013.01); *B61L 15/009* (2013.01); *G05B 13/024* (2013.01)

(58) Field of Classification Search
CPC .... B61L 15/0009; B61L 15/009; B61L 15/00; G05B 13/024; G05B 13/00; G05B 13/02;
(Continued)

(56) References Cited

U.S. PATENT DOCUMENTS 6,587,824 B1    7/2003   Everhart et al.
7,236,859 B2 *  6/2007   Horst .................. B61C 17/12
                                                  701/19
(Continued)

FOREIGN PATENT DOCUMENTS

CN    103208284 A    7/2013
CN    103645876 A    3/2014
(Continued)

OTHER PUBLICATIONS

Zhang et al.: "Design and Implementation of a Train Audio Control Unit of the Passenger Information System (PIS) Based on SIP", Journal of Shanghai Jiao Tong University, vol. 48, No. 7, Jul. 2014, pp. 1021-1025, DOI:10.16183/j.cnki.jsjtu.2014.07.022—English abstract.

*Primary Examiner* — Khoi H Tran
*Assistant Examiner* — Sarah A Tran
(74) *Attorney, Agent, or Firm* — Laurence A. Greenberg; Werner H. Stemer; Ralph E. Locher

(57) ABSTRACT

A method for controlling a rail vehicle includes recording a voice message of an user of the rail vehicle which contains a control parameter for controlling the rail vehicle. The control parameter is extracted from the recorded voice message. The extracted control parameter is displayed and the rail vehicle is controlled on the basis of the extracted control parameter only upon detection of a release command of the user that the extracted control parameter may be used for controlling the rail vehicle.

9 Claims, 2 Drawing Sheets

(58) Field of Classification Search
CPC ....... G05B 13/0205; G06F 3/167; G06F 3/00;
G06F 3/16
USPC .......................................................... 701/19
See application file for complete search history.

(56) References Cited

U.S. PATENT DOCUMENTS

| | | | |
|---|---|---|---|
| 7,962,337 B2* | 6/2011 | Steinbiss | G06F 21/32 |
| | | | 704/270.1 |
| 9,633,498 B2* | 4/2017 | Wiewiora | G07C 9/37 |
| 2003/0097210 A1* | 5/2003 | Horst | B61C 17/12 |
| | | | 701/19 |
| 2005/0096905 A1* | 5/2005 | Steinbiss | G10L 15/28 |
| | | | 704/E15.046 |
| 2006/0041337 A1* | 2/2006 | Augsburger | F02D 41/26 |
| | | | 701/1 |
| 2008/0133230 A1 | 6/2008 | Herforth | |
| 2013/0185065 A1 | 7/2013 | Tzirkel-Hancock et al. | |
| 2014/0244914 A1* | 8/2014 | Tzeng | G06F 13/1673 |
| | | | 711/103 |
| 2016/0028544 A1* | 1/2016 | Hyde | H04L 9/0662 |
| | | | 711/112 |
| 2016/0207550 A1 | 7/2016 | Raeder et al. | |
| 2018/0082697 A1 | 3/2018 | Iwase et al. | |
| 2020/0174782 A1* | 6/2020 | Buecherl | G06F 21/44 |

FOREIGN PATENT DOCUMENTS

| | | |
|---|---|---|
| CN | 105799738 A | 7/2016 |
| CN | 107901915 A | 4/2018 |
| DE | 102013108627 A1 | 4/2014 |
| GB | 2440766 A | 2/2008 |
| JP | 6033927 B1 | 11/2016 |

\* cited by examiner

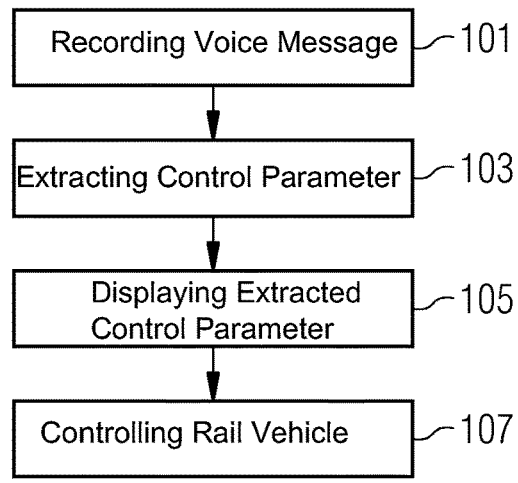
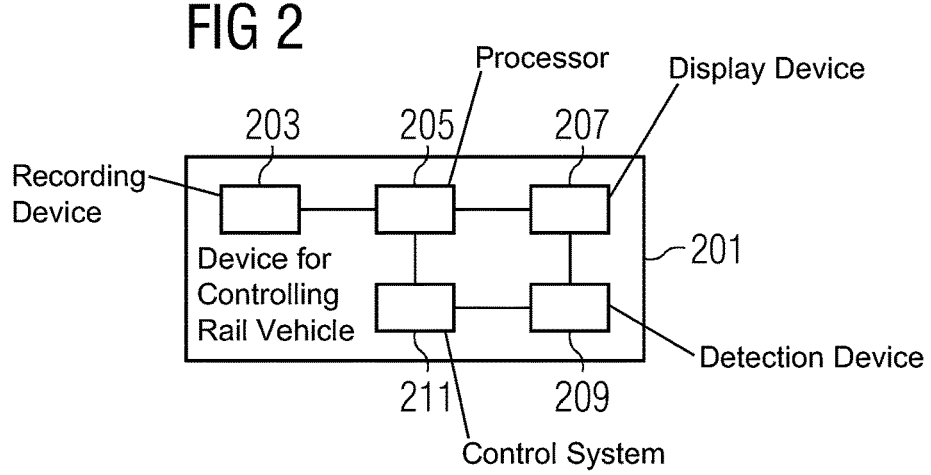
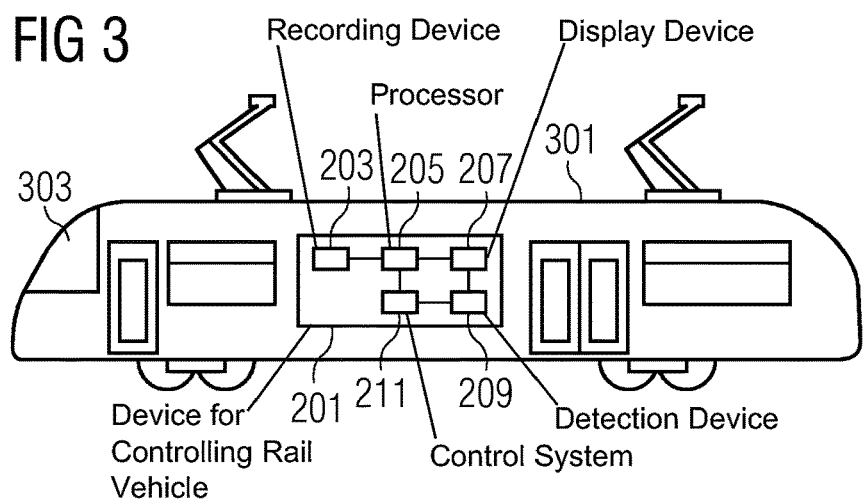

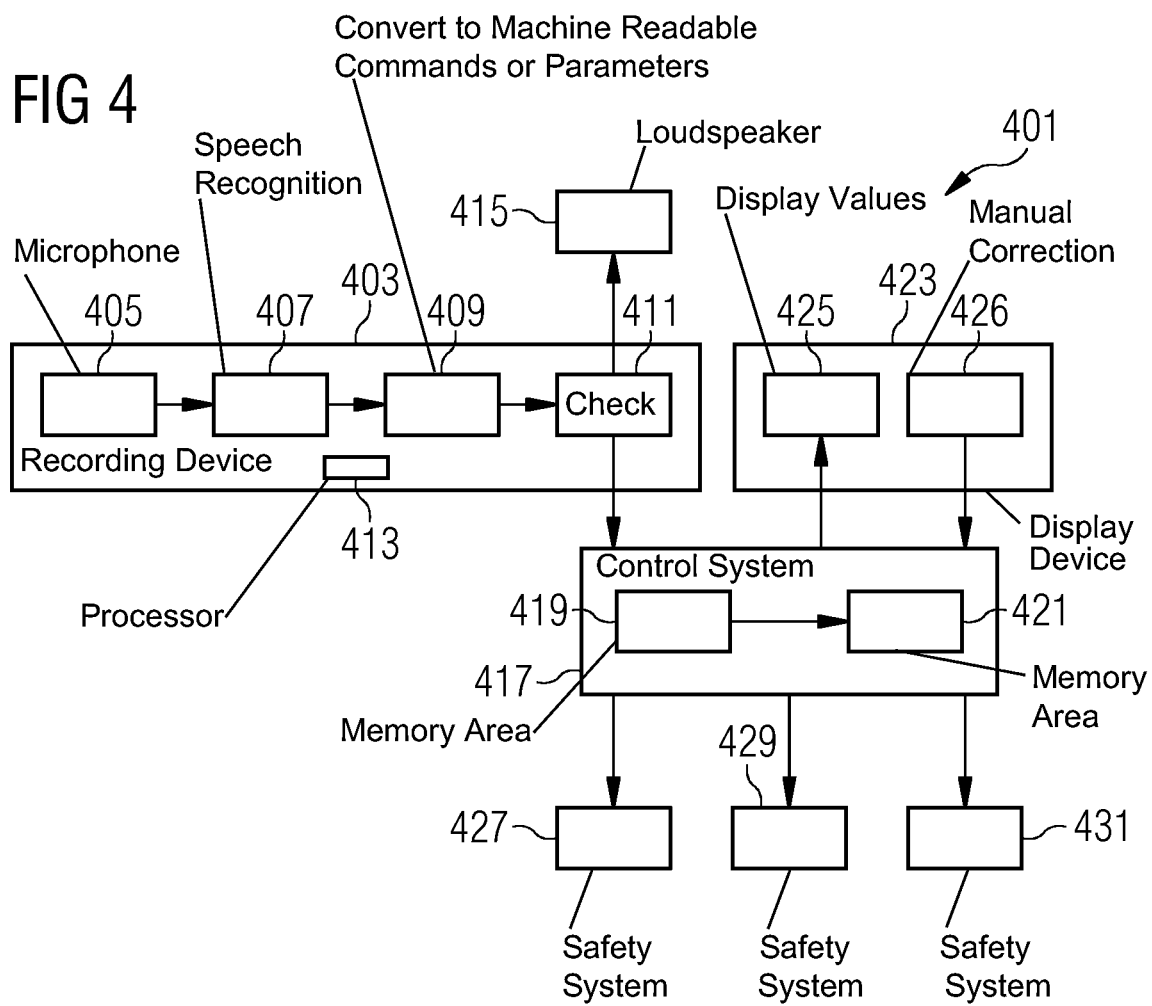

METHOD AND DEVICE FOR CONTROLLING A RAIL VEHICLE

BACKGROUND OF THE INVENTION

Field of the Invention

The invention relates to a method and a device for controlling a rail vehicle. The invention also relates to a rail vehicle and a computer program.

It is known to enter numbers manually on a screen in a driver's compartment of a rail vehicle using a simulated keyboard based on soft keys on a touch-sensitive screen, or via buttons on the screen. For example, when entering train data, many values must be entered, possibly multiple times for each train safety system.

Since this is very time-consuming, there is a need to shorten the corresponding input time.

There is also a need to reduce incorrect entries.

The unexamined application DE 10 2013 108 627 A1 discloses a voice-controlled communication system.

U.S. Pat. No. 7,236,859 B2 discloses a remote control system for a locomotive.

A remote control system for a locomotive is known from U.S. patent disclosure 2003/0097210 A1, in which voice commands are used.

SUMMARY OF THE INVENTION

The object addressed by the invention is to provide a design for efficiently controlling a rail vehicle.

This object is achieved by means of the subject matter of each of the independent claims. Advantageous configurations of the invention are the subject matter of the respective dependent sub-claims.

According to a first aspect, a method for controlling a rail vehicle is provided, comprising the following steps: recording a voice message from a user of the rail vehicle comprising a control parameter (or, for example, a plurality of control parameters) for controlling the rail vehicle,
    extracting the control parameter from the recorded voice message,
    displaying the extracted control parameter,
    controlling the rail vehicle on the basis of the extracted control parameter only upon detection of a release command from the user that the extracted control parameter may be used for controlling the rail vehicle.

According to a second aspect, a device for controlling a rail vehicle is provided, comprising:
    an acoustic recording device for recording a voice message from a user of the rail vehicle comprising a control parameter (or, for example, a plurality of control parameters) for controlling the rail vehicle,
    a processor for extracting the control parameter from the recorded voice message,
    a display device for displaying the extracted control parameter and
    a detection device for detecting a release command from the user that the extracted control parameter may be used for controlling the rail vehicle, and
    a control system for controlling the rail vehicle on the basis of the extracted control parameter only upon detection of the release command from the user that the extracted control parameter may be used for controlling the rail vehicle.

According to a third aspect, a rail vehicle is provided, which comprises the device according to the second aspect.

According to a fourth aspect, a computer program is provided, which comprises program code for carrying out the method according to the first aspect when the computer program is executed on a computer, for example on the device according to the second aspect.

The invention is based on the recognition that the above object can be achieved by the fact that the control parameter or control parameters for controlling the rail vehicle is or are no longer entered manually, but dictated instead. A voice-driven control of the rail vehicle therefore takes place. The control parameter or parameters are thus entered via voice input and not via manual input.

For example, this results in the technical advantage that an input time can be shortened.

In addition, it results in the technical advantage that, for example, incorrect entries can be efficiently reduced.

In particular, it results in the technical advantage that a design for the efficient control of a rail vehicle is provided.

Whenever the control parameter is used in the singular, the plural is deemed to be always implied, and vice versa.

A rail vehicle in the sense of the description is, for example, motorized or unmotorized.

For example, a rail vehicle is one of the following rail vehicles: locomotive, trainset, engine vehicle, motor coach, wagon, handcar.

According to one embodiment it is provided that, upon detection of a correction request from the user in relation to the displayed control parameter, the displayed control parameter is corrected according to the correction request, wherein the corrected control parameter is displayed, wherein the rail vehicle is controlled on the basis of the corrected control parameter only upon detection of a release command from the user that the corrected control parameter may be used for controlling the rail vehicle.

This results, for example, in the technical advantage that an incorrectly entered control parameter can be corrected efficiently.

According to the invention, it is provided that a first memory area and a second memory area are provided, the first memory area and the second memory area being logically and/or physically separated from each other, wherein the corresponding control parameter is stored in the first memory area before the railway vehicle is controlled, wherein the corresponding control parameter stored in the first memory area is copied from the first memory area to the second memory area after the corresponding release command has been detected, so that the rail vehicle is controlled based on the corresponding control parameter copied into the second memory area.

This results, for example, in the technical advantage that the control parameter can still be changed before the control parameter is used for controlling the rail vehicle. The control of the rail vehicle here is therefore based on the control parameter stored in the second memory area, and not on the control parameter stored in the first memory area. In one operating mode of the rail vehicle, the control parameter stored in the second memory area is therefore read out and used to control the vehicle accordingly. In the operating mode of the rail vehicle, therefore, the control parameter stored in the first memory area is not read out for controlling the rail vehicle.

This means that the control parameter stored in the first memory area can be changed without affecting the operating mode or the control of the rail vehicle.

Since the control parameter may have an effect on safety-related functions of the rail vehicle, according to this embodiment, prior to the use of the control parameter for controlling the rail vehicle an explicit confirmation or release is provided by the user, for example, a rail vehicle driver, such as a train driver. The release or confirmation here corresponds to the release command.

Thus, for example, it is provided that the control parameter stored in the first memory area is displayed to the user. This gives the user an easy means of checking whether his/her voice input has been correctly recognized. Only after its release by the user is the control parameter stored in the first memory area copied to the second memory area, and therefore only then is it available for controlling the rail vehicle.

For example, after the voice input the control parameter is displayed on a display once again. The train driver confirms the correctness and releases them for operation. They are then copied from the first memory area (input memory) into the second memory area (the process controller), for example in the control system.

Thus, the input control parameters (which can generally also be referred to as train data) can still be changed before the transfer into the operating mode. It is also ensured that the transferred train data are checked for correctness once more before the transfer into the operating mode.

In another embodiment, it is provided that the display of the corresponding control parameter comprises displaying the control parameter stored in the first memory area.

This means, for example, that the technical advantage is achieved that it is possible to check that the control parameter was stored in the first memory area without being corrupted.

The phrase "the corresponding release command" therefore comprises the following notions: the "release command that the extracted control parameter may be used to control the rail vehicle", and the "release command from the user that the corrected control parameter may be used to control the rail vehicle".

The phrase "the corresponding control parameter" therefore comprises the following notions: the "control parameter extracted from the recorded voice message" and the "corrected control parameter".

One embodiment provides that the detection of the user's correction request comprises a recording of a further voice message from the user, comprising a corrected control parameter for controlling the rail vehicle.

The steps of extracting the corrected control parameter and displaying the corrected control parameter are therefore analogous in particular to the steps of extracting the control parameter and displaying the extracted control parameter. The corresponding statements apply mutatis mutandis.

In one embodiment it is provided that the extraction of the control parameter comprises performing a speech recognition, wherein in the event of a control parameter not being recognized a warning is output to the user that no control parameter could be recognized.

This results, for example, in the technical advantage that the user is efficiently made aware that the control parameter could not be extracted. The user can thus enter the control parameter once again by means of voice input.

In another embodiment, it is provided that the control parameter comprises a keyword and a value assigned to the keyword, wherein it is checked whether the keyword corresponds to a predetermined keyword, wherein if the keyword does not correspond to the predetermined keyword a warning is output to the user that the predetermined keyword is missing from the recorded voice message.

This results, for example, in the technical advantage that it can be efficiently ensured that certain control parameters are also entered, such as: train length, maximum speed, braking percentage, type of braking, axle load.

For example, a control parameter is thus one of the following control parameters: train length, maximum speed, braking percentage, type of braking, axle load.

In one embodiment it is provided that the recording of the voice message is started only in response to a detection of a recording start command from the user and/or wherein the recording of the voice message is ended only in response to a detection of a recording stop command from the user.

This results, for example, in the technical advantage that the starting and/or ending of the recording of the voice message can be carried out efficiently.

In particular, this results in the technical advantage that the voice message is only started, or that the voice message is only stopped, when the user issues a corresponding command.

Such a recording start command or such a recording stop command includes, for example, an acoustic recording start command or an acoustic recording stop command respectively.

This means, in particular, that the user can start or stop the recording via a voice control.

In another embodiment, it is provided that the starting or the ending of the recording is performed in response to a detection of an input on a touch-sensitive display screen.

According to one embodiment it is provided that the device for controlling a rail vehicle is configured or designed to execute or carry out the method for controlling a rail vehicle.

According to one embodiment it is provided that the method for controlling a rail vehicle is executed or carried out by means of the device for controlling a rail vehicle.

Technical functionalities with regard to the device are obtained analogously from the corresponding technical functionalities with regard to the method.

This means, in particular, that device features are obtained from corresponding method features and vice versa.

According to one embodiment it is provided that the rail vehicle is designed or configured to execute or carry out the method for controlling a rail vehicle.

According to one embodiment it is provided that the device comprises an audio recorder, which comprises the acoustic recording device.

In one embodiment, the audio recorder comprises the processor.

According to one embodiment, the device is a mobile terminal, for example a mobile phone.

In one embodiment, the acoustic recording device comprises one or more microphones.

In one embodiment it is provided that the detection device is designed to detect a correction request from the user with regard to the displayed control parameter.

In one embodiment it is provided that the processor is designed to correct the displayed control parameter according to a correction request upon detection of the correction request from the user with regard to the displayed control parameter.

In one embodiment it is provided that the display device is designed to display the corrected control parameter.

According to one embodiment it is provided that the detection device is designed to detect a release command from the user that the corrected control parameter may be used to control the rail vehicle.

In one embodiment it is provided that the control system is designed to control the rail vehicle only upon detection of a release command from the user that the corrected control parameter may be used to control the rail vehicle, based on the corrected control parameter.

In one embodiment, a first memory area and a second memory area are provided.

In one embodiment, the first memory area and the second memory area are logically and/or physically separated from each other.

In one embodiment it is provided that the processor is designed to store the corresponding control parameter in the first memory area before controlling the rail vehicle.

In one embodiment it is provided that the processor, respectively the control system, is designed to copy the corresponding control parameter stored in the first memory area from the first memory area into the second memory area after the detection of the corresponding release command.

In one embodiment the control system is designed to control the rail vehicle based on the corresponding control parameter copied into the second memory area.

According to one embodiment it is provided that the display device is designed to display the control parameter stored in the first memory area.

According to one embodiment it is provided that the processor is designed to perform speech recognition.

In one embodiment it is provided that the display device is designed, in the event of a control parameter not being recognized, to display a warning to the user that no control parameter could be recognized.

In one embodiment a loudspeaker is provided, via which, in the event of no control parameter being recognized, a warning is output to the user that no control parameter could be recognized. For example, the processor is designed to control the loudspeaker accordingly.

According to one embodiment it is provided that the control parameter comprises a keyword and a value assigned to the keyword, wherein the processor is designed to check whether the keyword matches a predetermined keyword.

In one embodiment it is provided that the display device, respectively the loudspeaker, are designed to output a warning to the user that the predetermined keyword is missing in the recorded voice message, if the keyword does not match the predetermined keyword.

In one embodiment it is provided that the recording device is designed to start the voice message only in response to detecting a recording start command from the user.

In one embodiment it is provided that the recording device is designed to start the voice message recording only in response to detecting a recording stop command from the user.

In one embodiment it is provided that the detection device is designed to detect a corresponding recording start command, respectively a corresponding recording stop command from the user.

In one embodiment, the detection device comprises a touch-sensitive display screen, which according to another embodiment is comprised by the display device.

In one embodiment, the detection device comprises one or more keys, which are arranged, for example, in a housing frame of a display screen, such as the touch-sensitive display screen.

The display screen can therefore be operated in particular by such keys.

The term "respectively" includes in particular the phrase "and/or".

The properties, features and advantages of the present invention described above and the manner in which these are achieved, will become clearer and more comprehensible in conjunction with the following description of the exemplary embodiments, which are explained in more detail in connection with the drawings.

BRIEF DESCRIPTION OF THE SEVERAL VIEWS OF THE DRAWING

FIG. 1 shows a flowchart of a method for controlling a rail vehicle,

FIG. 2 shows a device for controlling a rail vehicle,

FIG. 3 shows a rail vehicle, and

FIG. 4 shows a block diagram of an operating principle of a device for controlling a rail vehicle.

DETAILED DESCRIPTION OF THE INVENTION

FIG. 1 shows a flowchart of a method for controlling a rail vehicle.

The method comprises the following steps:

recording 101 a voice message of a user of the rail vehicle, comprising a control parameter for controlling the rail vehicle, extracting 103 the control parameter from the recorded voice message, displaying 105 the extracted control parameter, controlling 107 the rail vehicle on the basis of the extracted control parameter only upon detection of a release command from the user that the extracted control parameter may be used for controlling the rail vehicle.

FIG. 2 shows a device 201 for controlling a rail vehicle, comprising:

an acoustic recording device 203 for recording a voice message from a user of the rail vehicle, comprising a control parameter for controlling the rail vehicle, a processor 205 for extracting the control parameter from the recorded voice message, a display device 207 for displaying the extracted control parameter, and a detection device 209 for detecting a release command from the user that the extracted control parameter may be used for controlling the rail vehicle, and a control system 211 for controlling the rail vehicle on the basis of the extracted control parameter only upon detection of the release command from the user that the extracted control parameter may be used for controlling the rail vehicle.

FIG. 3 shows a rail vehicle 301.

The rail vehicle 301 comprises a driver's compartment 303.

The rail vehicle 301 comprises the device 201 according to FIG. 2.

In one embodiment it is provided that one, more than one, or all elements of the device 201 are arranged within the driver's compartment 303.

FIG. 4 shows a block diagram of an operating principle of a device 401 for controlling a rail vehicle.

The device 401 comprises an acoustic recording device 403. The recording device 403 comprises a microphone 405 for recording a voice message from a user of the rail vehicle, comprising a control parameter for controlling the rail vehicle.

According to another embodiment, the recording of the voice message is started via an acoustic command or via an input on a touch-sensitive display screen.

According to a step 407 a speech recognition is performed on the recorded voice message.

In accordance with the speech recognition, recognized control parameters and/or commands are converted into machine-readable commands and/or machine-readable control parameters according to a step 409.

In a step 411, a check of the converted commands or control parameters takes place.

The speech recognition, the conversion, and the checking are performed using a processor 413.

As part of the check according to step 411, it is checked, for example, whether a figure for the total weight of the rail vehicle appears in a checklist. If this is the case, an identifier for the total train weight and the total train weight itself are transmitted to a control system 417 and stored in a first memory area 419.

The first memory area 419 can generally also be referred to as a temporary memory area.

For example, if a keyword from the checklist or an input control parameter or a value assigned to a keyword is not recognized correctly, according to one embodiment a warning is output via a loudspeaker 415 which is part of the device 415.

The value or control parameter or keyword that is not correctly recognized can then be entered once again using another voice input.

If all necessary control parameters have been entered via a voice input, in accordance with one embodiment the recording of the voice message is terminated in response to the detection of recording stop command from the user.

According to one embodiment, both the detection of the recording start command and the detection of a recording stop command are performed using the microphone 405.

The elements stored in the first memory area 419 are transmitted to a display device 423, which displays the transmitted values according to a step 425.

For example, the display device 423 is a touch-sensitive display screen.

The transmission of the values of the first memory area 419 to the display device 423 is carried out on the basis of a secure procedure.

For example, this results in the technical advantage that it can be efficiently ensured that no corruption of the data takes place during the transmission.

A secure procedure refers to a procedure in which information, in this case the control parameter or parameters, is transmitted on two different channels. After checking the correctness of the displayed values, the user must then acknowledge them. Only then will the information be released for further processing, in this case control.

If values have been entered incorrectly, a manual correction of the values can still be performed on the display device 423.

This is provided according to step 426.

These values are transmitted back to the control system 417 where they are stored in the first memory area 419.

They are then sent to the display device 423 again to be displayed there again, so that a user of the rail vehicle can acknowledge them.

The acknowledgment is sent to the control system 417, wherein in response to the receipt of the acknowledgment by the control system 417 the data in the first memory area 419 are copied into a second memory area 421 of the control system 417.

The acknowledgment corresponds to or comprises, for example, a key press by a user of the rail vehicle, for example an engine driver.

For example, the acknowledgment is sent to the control system 417 in a secure procedure, such as an antivalent transmission. In an antivalent transmission, the binary value "1", for example, is transmitted as "1" and on a second channel as "$0$" (negated). Both values are then compared on the receiving side. This ensures that no data become corrupted during transmission. An antivalent transmission is thus an example of a secure procedure.

As a result, these data are available for downstream train safety systems 427, 429, 431 during operation of the rail vehicle.

In this respect, the second memory area can also be generally referred to as an operating memory.

The data are transmitted from the second memory area 421 to the downstream train safety systems 427, 429, 431 in a secure transmission procedure, depending on the requirements for the individual values to be transferred, for example.

The preceding and following data therefore comprise, in particular, the control parameter or parameters.

In particular, the design according to the invention has the technical advantage of a faster input of control parameters, e.g. for a train data input. This leads, for example, to time savings when upgrading a rail vehicle.

Furthermore, the design according to the invention provides improved ergonomics for entering the data.

Furthermore, the approach according to the invention results in higher availability of the rail vehicles.

Data can thus be entered into a control system of a rail vehicle more quickly.

This further simplifies an architecture with a plurality of train safety systems in a rail vehicle.

The approach according to the invention can also be used for a different type of input on the display screen, which was previously performed via a selection of keys or soft keys on the screen. If the data to be entered are not relevant to safety, the corresponding checks can also be omitted during the data entry.

Although the invention has been illustrated and described in greater detail by means of the preferred exemplary embodiments, the invention is not restricted by the examples disclosed and other variations can be derived therefrom by the person skilled in the art without departing from the scope of protection of the invention.

The invention claimed is:

1. A method for controlling a rail vehicle, which comprises the following steps of:
   obtaining a recorded voice message by recording a voice message of a user of the rail vehicle, the recorded voice message containing a control parameter for controlling the rail vehicle;
   obtaining an extracted control parameter by extracting the control parameter from the recorded voice message;
   displaying the extracted control parameter;
   controlling, with a control system, the rail vehicle on a basis of the extracted control parameter only upon detection of a release command from the user so that the extracted control parameter may be used for controlling the rail vehicle; and
   providing the control system with a first memory area and a second memory area, the first memory area and the second memory area being logically and/or physically separated from each other, wherein the extracted control parameter is stored in the first memory area before the rail vehicle is controlled, wherein the extracted control parameter stored in the first memory area is copied from the first memory area into the second memory area after a detection of the release command, so that the rail vehicle is controlled based on the extracted control parameter copied into the second memory area.

2. The method according to claim 1, wherein, upon detecting a correction request from the user in relation to the extracted control parameter being displayed, the extracted control parameter is corrected according to the correction request, wherein a corrected control parameter is displayed, wherein the rail vehicle is controlled on a basis of the corrected control parameter only upon detection of a further release command from the user that the corrected control parameter may be used for controlling the rail vehicle.

3. The method according to claim 1, wherein the display of the extracted control parameter includes displaying the extracted control parameter stored in the first memory area.

4. The method according to claim 1, wherein the extracting of the control parameter comprises performing speech recognition on the recorded voice message, wherein in an event of no control parameter being recognized a warning is output to the user that no control parameter could be recognized.

5. The method according to claim 1, wherein the control parameter contains a keyword and a value assigned to the keyword, wherein it is checked whether the keyword corresponds to a predetermined keyword, wherein if the keyword does not correspond to the predetermined keyword, a warning is output to the user that the predetermined keyword is missing from the voice message recorded.

6. The method according to claim 1, wherein the recording of the voice message is started only in response to a detection of a recording start command from the user and/or wherein the recording of the voice message is ended only in response to a detection of a recording stop command from the user.

7. A device for controlling a rail vehicle, comprising:
an acoustic recording device for obtaining a recorded voice message by recording a voice message of a user of the rail vehicle, the recorded voice message containing a control parameter for controlling the rail vehicle;
a processor for obtaining an extracted control parameter by extracting the control parameter from the recorded voice message;
a display device for displaying the extracted control parameter;
a detection device for detecting a release command from the user so that the extracted control parameter may be used for controlling the railway vehicle; and
a control system for controlling the rail vehicle on a basis of the extracted control parameter only upon detection of the release command from the user, so that the extracted control parameter may be used for controlling the rail vehicle;
said control system including a first memory area and a second memory area, said first memory area and said second memory area being logically and/or physically separated from each other, wherein the extracted control parameter is stored in said first memory area before the rail vehicle is controlled, wherein the extracted control parameter stored in said first memory area is copied from said first memory area into said second memory area after a detection of the release command, so that the rail vehicle is controlled based on the extracted control parameter copied into said second memory area.

8. A rail vehicle, comprising:
a device according to claim 7.

9. A non-transitory computer medium containing computer-executable instructions, said computer-executable instructions when executed on a computer performing a method for controlling a rail vehicle, which comprises the following steps of:
obtaining a recorded voice message by recording a voice message of a user of the rail vehicle, the recorded voice message containing a control parameter for controlling the rail vehicle;
obtaining an extracted control parameter by extracting the control parameter from a recorded voice message;
displaying the extracted control parameter;
controlling, with a control system, the rail vehicle on a basis of the extracted control parameter only upon detection of a release command from the user so that the extracted control parameter may be used for controlling the rail vehicle;
providing the control system with a first memory area and a second memory area, the first memory area and the second memory area being logically and/or physically separated from each other, wherein the extracted control parameter is stored in the first memory area before the rail vehicle is controlled, wherein the extracted control parameter stored in the first memory area is copied from the first memory area into the second memory area after a detection of the release command, so that the rail vehicle is controlled based on the extracted control parameter copied into the second memory area.

* * * * *